(12) United States Patent
Klotz, Jr. et al.

(10) Patent No.: US 10,423,677 B2
(45) Date of Patent: *Sep. 24, 2019

(54) TIME-BOX CONSTRAINED SEARCHING IN A DISTRIBUTED SEARCH SYSTEM

(71) Applicant: Samsung Electronics Co., Ltd., Suwon-si, Gyeonggi-do (KR)

(72) Inventors: Leigh Klotz, Jr., Palo Alto, CA (US); Eric Glover, Palo Alto, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 262 days.

This patent is subject to a terminal disclaimer.

(21) Appl. No.: 15/671,074

(22) Filed: Aug. 7, 2017

(65) Prior Publication Data

US 2017/0337282 A1 Nov. 23, 2017

Related U.S. Application Data

(63) Continuation of application No. 14/577,898, filed on Dec. 19, 2014, now Pat. No. 9,727,648.

(51) Int. Cl.
| | |
|---|---|
| *G06F 16/00* | (2019.01) |
| *G06F 16/951* | (2019.01) |
| *G06F 16/35* | (2019.01) |
| *G06F 16/242* | (2019.01) |
| *G06F 16/248* | (2019.01) |
| *G06F 16/33* | (2019.01) |
| *G06F 16/335* | (2019.01) |
| *G06F 16/2455* | (2019.01) |

(52) U.S. Cl.
CPC .......... *G06F 16/951* (2019.01); *G06F 16/242* (2019.01); *G06F 16/248* (2019.01); *G06F 16/2455* (2019.01); *G06F 16/334* (2019.01); *G06F 16/335* (2019.01); *G06F 16/35* (2019.01)

(58) Field of Classification Search
CPC combination set(s) only.
See application file for complete search history.

(56) References Cited

U.S. PATENT DOCUMENTS

| | | | |
|---|---|---|---|
| 6,134,541 A | 10/2000 | Castelli et al. | |
| 7,603,358 B1 | 10/2009 | Anderson et al. | |
| 8,417,693 B2 * | 4/2013 | Lempel | ............... G06F 21/6227 |
| 8,707,361 B2 | 4/2014 | Jeffs | |
| 8,892,589 B1 | 11/2014 | Garg et al. | |

(Continued)

*Primary Examiner* — Noosha Arjomandi
(74) *Attorney, Agent, or Firm* — Jefferson IP Law, LLP

(57) ABSTRACT

A method includes receiving a search query containing one or more query terms from a remote device, determining one or more entity types implicated by the search query based on the one or more query terms, and determining an entity score indicating a likelihood that the search query implicates the entity type. The method also includes identifying one or more index clusters from index clusters to search based on the one or more entity types implicated by the search query, generating a query execution plan based on the entity scores, and performing a consumer driven search on the identified index clusters based on a set of query terms corresponding to the one or more query terms and in accordance with the query execution plan to identify a delivery consideration set of records. The method also includes generating delivery search results based on the delivery consideration set of records.

1 Claim, 10 Drawing Sheets

(56) References Cited

U.S. PATENT DOCUMENTS

| | | | |
|---|---|---|---|
| 9,146,954 B1* | 9/2015 | Boe | G06F 16/248 |
| 9,342,586 B2 | 5/2016 | Mukherjee et al. | |
| 9,361,523 B1 | 6/2016 | Chen et al. | |
| 9,600,501 B1* | 3/2017 | Fuller | G06F 16/27 |
| 10,102,268 B1* | 10/2018 | Sivathanu | G06F 16/282 |
| 2003/0018629 A1* | 1/2003 | Namba | G06F 16/355 |
| 2003/0158839 A1* | 8/2003 | Faybishenko | G06F 16/9535 |
| 2004/0267719 A1 | 12/2004 | Doherty et al. | |
| 2005/0055341 A1* | 3/2005 | Haahr | G06F 16/3326 |
| 2005/0102270 A1 | 5/2005 | Risvik et al. | |
| 2007/0094293 A1* | 4/2007 | Solaro | G06F 16/951 |
| 2007/0288453 A1 | 12/2007 | Podilchuk | |
| 2008/0091670 A1 | 4/2008 | Ismalon | |
| 2009/0018996 A1 | 1/2009 | Hunt et al. | |
| 2009/0024605 A1* | 1/2009 | Yang | G06F 16/9535 |
| 2009/0119261 A1* | 5/2009 | Ismalon | G06F 16/3322 |
| 2010/0036883 A1 | 2/2010 | Valencia-Campo et al. | |
| 2010/0198823 A1* | 8/2010 | Tsoukalas | G06F 17/241 707/736 |
| 2013/0097142 A1* | 4/2013 | Kim | G06Q 30/02 707/706 |
| 2013/0097143 A1 | 4/2013 | Shenoy et al. | |
| 2013/0097144 A1 | 4/2013 | Siamwalla et al. | |
| 2013/0110827 A1* | 5/2013 | Nabar | G06F 16/9535 707/728 |
| 2014/0089258 A1 | 3/2014 | She | |
| 2014/0164336 A1* | 6/2014 | Moon | H04N 19/895 707/674 |
| 2014/0181084 A1 | 6/2014 | Herron | |
| 2014/0222826 A1 | 8/2014 | DaCosta et al. | |
| 2014/0236942 A1 | 8/2014 | Li | |
| 2014/0280267 A1* | 9/2014 | Perlegos | G06F 16/43 707/758 |
| 2014/0331044 A1* | 11/2014 | Fujii | H04L 9/3239 713/165 |
| 2015/0112967 A1 | 4/2015 | Shimizu et al. | |
| 2016/0179953 A1 | 6/2016 | Klotz, Jr. et al. | |
| 2018/0307727 A1* | 10/2018 | Lucas | G06F 9/50 |

* cited by examiner

TIME-BOX CONSTRAINED SEARCHING IN A DISTRIBUTED SEARCH SYSTEM

CROSS-REFERENCE TO RELATED APPLICATIONS

This application is a continuation of U.S. patent application Ser. No. 14/577,898 filed Dec. 19, 2014 (now U.S. Pat. No. 9,727,648). The entire disclosure of the application referenced above is incorporated by reference.

FIELD

This disclosure relates to time-box constrained searching in a distributed search system.

BACKGROUND

Search systems can be utilized in many different fields. Search systems can be used to identify content on the World Wide Web (the "Web"), identify applications, or identify functionalities across the Web and a collection of applications. A common expectation is that search results are delivered in a timely manner. In the searching field, however, a timely manner can be under 1 second from the time the search query is presented to the time the search results are received (absent a network lag). Another common expectation is that search results be relevant to the search query. Thus, search system users have come to expect relevant results for any search query almost instantaneously.

SUMMARY

One aspect of the disclosure provides a method that includes receiving a search query containing one or more query terms at a processing system from a remote device and determining one or more entity types implicated by the search query based on the one or more query terms, and for each entity type, determining an entity score indicating a likelihood that the search query implicates the entity type. The method also includes identifying one or more index clusters from a plurality of index clusters to search based on the one or more entity types implicated by the search query and generating a query execution plan based on the entity scores of the one or more entity types, the query execution plan indicating by the processing system. Each index cluster has a plurality of tiers each including one or more search indexes. The query execution plan indicates, for each cluster, i) a priority assigned to a search of the index cluster and ii) a time constraint assigned to the indicating cluster indicating a maximum amount of time allotted to search the index cluster. The method also includes the processing system performing a consumer driven search on the identified index clusters based on a set of query terms corresponding to the one or more query terms and in accordance with the query execution plan to identify a delivery consideration set of records, generating delivery search results based on the delivery consideration set of records, and transmitting the delivery search results from the processing system to the remote device.

Implementations of the disclosure may include one or more of the following optional features. In some implementations, determining the one or more entity types includes, for at least one subset of the one or more query terms, querying a knowledge base with the subset of query terms, the knowledge base outputting one or more entity types and, for each entity type, a corresponding entity score of the entity type. The method may further include the processing device receiving user feedback from the remote device indicating a user response to the search results, and updating the knowledge base based on the user feedback. In some implementations, for each identified index cluster, the generating the query execution plan includes determining one or more entity types that implicated the index cluster, selecting the priority from a plurality of priorities based on the respective entity scores of the one or more entity types that implicated the index cluster, and selecting the time constraint of the index cluster based on the selected priority.

Optionally, the method also includes performing a continuation search on the selected index clusters based on the set of query terms to obtain a continuation consideration set of records. In this example, the continuation search at least includes searches of tiers of the selected index clusters that were unsearched during the consumer driven search and the continuation consideration set includes the delivery set. The method may further include the processing system generating continuation search results based on the continuation consideration set, storing the continuation search results in a memory cache, receiving a second search query containing the one or more query terms of the search query, retrieving the continuation search results from the memory cache, and transmitting the continuation search results. In some examples, the method also includes the processing device receiving user feedback indicating a user selection of a continuation search result generated from the continuation consideration set and updating one or more of the index clusters based on the user feedback. The updating the one or more index clusters optionally includes determining the index cluster that contains a particular record from which the selected continuation search result was identified, and moving the particular record to a higher tier within the index cluster. In some implementations, the method further includes updating the one or more of the selected index clusters based on the continuation search results and/or updating the knowledge base based on the continuation search results.

In some implementations, for each index cluster, tiers of the index cluster are stored on different types of memory devices with higher tiers being stored on faster memory drives. In some examples, for each index cluster indicated in the query execution plan, the performing the consumer driven search includes inserting the set of query terms in a queue corresponding to the index cluster with other sets of query terms, determining whether to search the index cluster using the set of query terms based on the priority associated with the set of query terms, the respective priorities of the other sets of query terms, an ordering of the queue, and a current demand on the index cluster. The index cluster may be searched using the set of query terms for a duration that does not exceed the value indicated by the time constraint when the index cluster is to be searched using the set of query terms. Each other set of query terms may have a respective priority assigned thereto, and the respective priorities of the other sets of query terms. In some examples, the method also includes performing a continuation search after the consumer driven search by, for each index cluster indicated in the query execution plan, assigning a lowest priority and an unlimited time constraint to the set of query terms with respect to the index cluster, inserting the set of query terms in the queue corresponding to the index cluster with other intent queries, searching all tiers of the index cluster using the set of query terms, and updating a continuation consideration set of records based on the searching. Each other intent query may have a respective priority assigned thereto and the continuation consideration set of records may indicate records identified across all of the index cluster indicated in the query execution plan. Moreover, the method may further include generating continuation search results based on the continuation consideration set of records, and storing the continuation search results in a memory cache.

Another aspect of the disclosure provides a search system including a storage system and a processing system. The storage system includes a plurality of storage devices and stores a knowledge base, a plurality of index clusters, and a plurality of records. The processing system includes one or more processors that execute computer readable instructions that cause the processing system to receive a search query containing one or more query terms at a processing system from a remote device and determine one or more entity types implicated by the search query based on the one or more query terms, and for each entity type, determine an entity score indicating a likelihood that the search query implicates the entity type. The computer instructions also cause the processing system to identify one or more index clusters from a plurality of index clusters to search based on the one or more entity types implicated by the search query and generate a query execution plan based on the entity scores of the one or more entity types, the query execution plan indicating by the processing system. Each index cluster has a plurality of tiers each including one or more search indexes. The query execution plan indicates, for each cluster, i) a priority assigned to a search of the index cluster and ii) a time constraint assigned to the indicating cluster indicating a maximum amount of time allotted to search the index cluster. The computer instructions also cause the processing system to perform a consumer driven search on the identified index clusters based on a set of query terms corresponding to the one or more query terms and in accordance with the query execution plan to identify a delivery consideration set of records, generate delivery search results based on the delivery consideration set of records, and transmit the delivery search results from the processing system to the remote device.

This aspect may include one or more of the following optional features. In some implementations, the processing devices determines the one or more entity types includes, for at least one subset of the one or more query terms, by querying a knowledge base with the subset of query terms, the knowledge base outputting one or more entity types and, for each entity type, a corresponding entity score of the entity type. Optionally, the computer instructions also cause the processing system to receive user feedback from the remote device indicating a user response to the search results, and update the knowledge base based on the user feedback. In some implementations, for each identified index cluster, the processing devices generates the query execution plan by determining one or more entity types that implicated the index cluster, selecting the priority from a plurality of priorities based on the respective entity scores of the one or more entity types that implicated the index cluster, and selecting the time constraint of the index cluster based on the selected priority.

Optionally, the computer instructions also cause the processing system to perform a continuation search on the selected index clusters based on the set of query terms to obtain a continuation consideration set of records. In this example, the continuation search at least includes searches of tiers of the selected index clusters that were unsearched during the consumer driven search and the continuation consideration set includes the delivery set. In some examples, the computer instructions also cause the processing system to generate generating continuation search results based on the continuation consideration set, store the continuation search results in a memory cache, receive a second search query containing the one or more query terms of the search query, retrieve the continuation search results from the memory cache, and transmit the continuation search results. In some examples, the computer instructions also cause the processing system to receive user feedback indicating a user selection of a continuation search result generated from the continuation consideration set and update one or more of the index clusters based on the user feedback. The updating the one or more index clusters optionally includes determining the index cluster that contains a particular record from which the selected continuation search result was identified, and moving the particular record to a higher tier within the index cluster. In some implementations, the processing devices updates the one or more of the selected index clusters based on the continuation search results and/or updating the knowledge base based on the continuation search results.

In some implementations, for each index cluster, tiers of the index cluster are stored on different types of memory devices with higher tiers being stored on faster memory drives. In some examples, for each index cluster indicated in the query execution plan, the consumer driven search performed by the processing device includes inserting the set of query terms in a queue corresponding to the index cluster with other sets of query terms, determining whether to search the index cluster using the set of query terms based on the priority associated with the set of query terms, the respective priorities of the other sets of query terms, an ordering of the queue, and a current demand on the index cluster. The index cluster may be searched using the set of query terms for a duration that does not exceed the value indicated by the time constraint when the index cluster is to be searched using the set of query terms. Each other set of query terms may have a respective priority assigned thereto, and the respective priorities of the other sets of query terms. In some examples, the computer instructions also cause the processing system to perform a continuation search after the consumer driven search by, and for each index cluster indicated in the query execution plan, assign a lowest priority and an unlimited time constraint to the set of query terms with respect to the index cluster, insert the set of query terms in the queue corresponding to the index cluster with other intent queries, search all tiers of the index cluster using the set of query terms, and update a continuation consideration set of records based on the searching. Each other intent query may have a respective priority assigned thereto and the continuation consideration set of records may indicate records identified across all of the index cluster indicated in the query execution plan. Moreover, the computer instructions may further cause the processing system to generate continuation search results based on the continuation consideration set of records, and store the continuation search results in a memory cache.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1A:
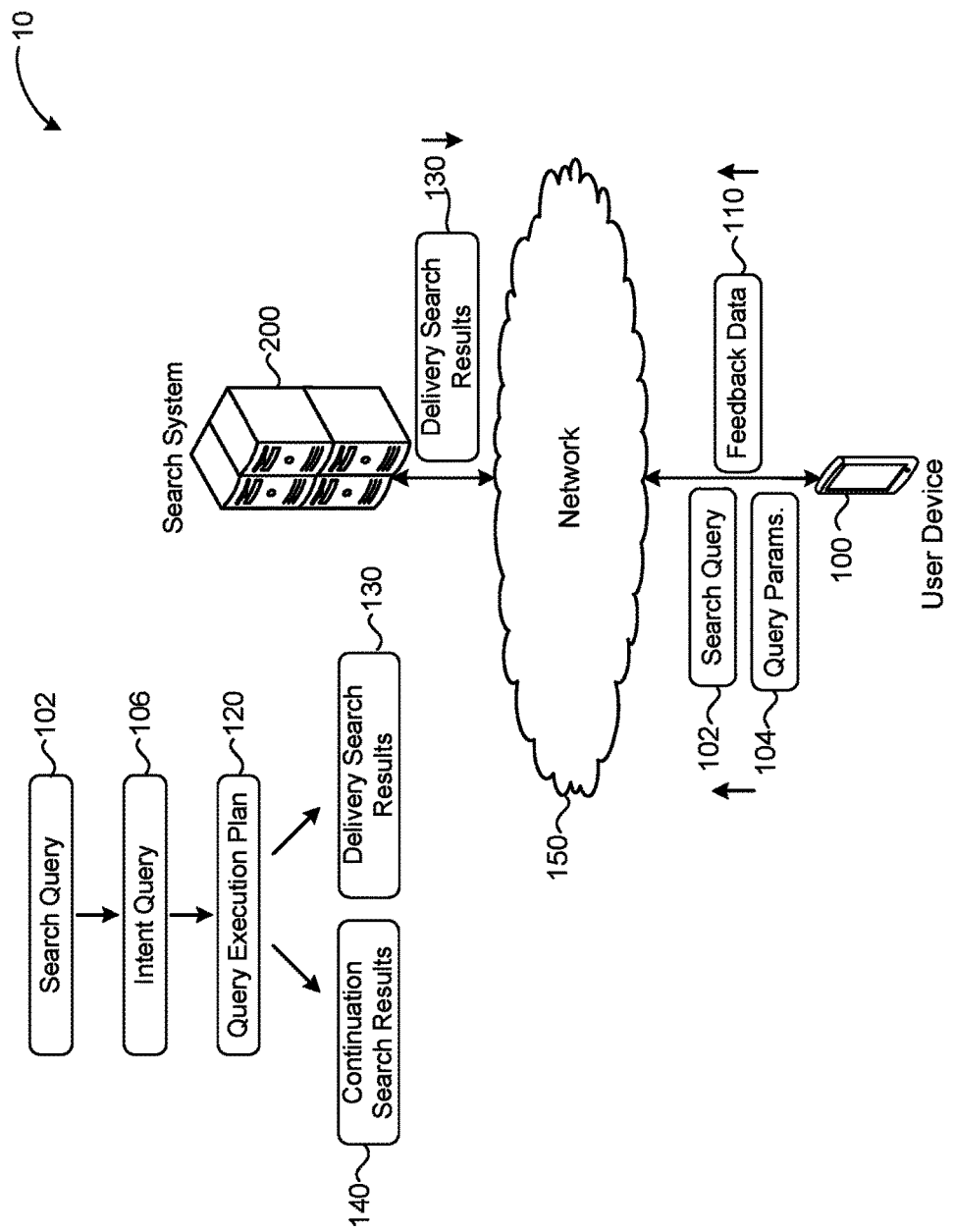
FIG. 1A is a schematic view of an example environment of a distributed search system.

FIG. 1A shows an example environment 10 of a distributed search system 200. A distributed search system 200 (or a "search system" 200) is a collection of computing devices that receives search queries 102 from user devices 100 via a network 150. While the user device 100 is depicted as a smartphone, a user device can be any suitable user computing device including, but not limited to, a tablet computing device, a personal computing device, a laptop computing device, a gaming device, a vehicle infotainment device, and/or a smart appliance (e.g., smart refrigerator or smart television). In response to receiving a search query 102 from a user device 100, the search system 200 generates delivery search results 130 based on the search query 102 and provides the delivery search results 130 to the user device 100. The search system 200 may perform any suitable type of searches. For example, the search system 200 may perform web searches (e.g., for content found on websites), application searches (e.g., for applications having particular attributes), and/or application state searches (e.g., for specific states or functions of either native or web applications).

Figure 1B:
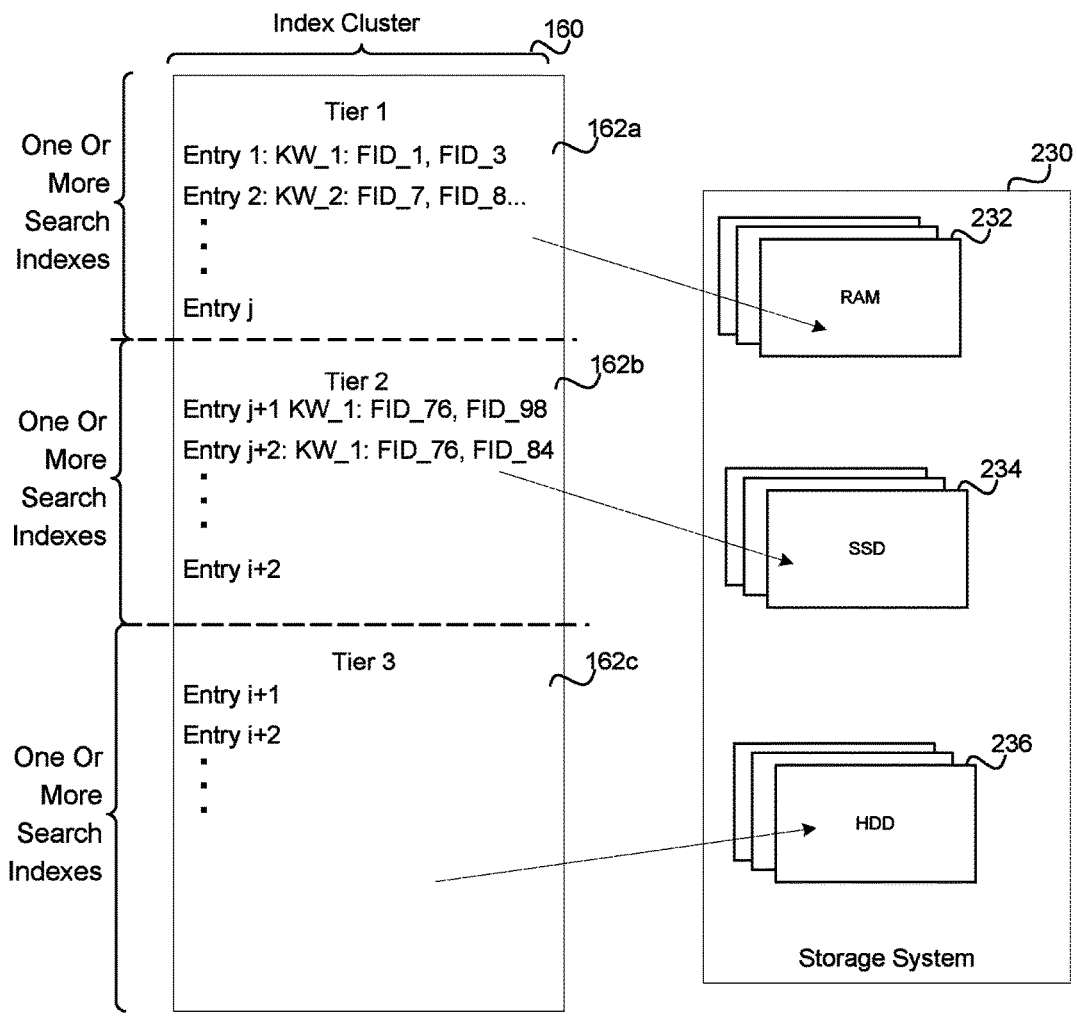
FIG. 1B is a schematic view of an example search index distributed across a storage system.
Figure 2A:
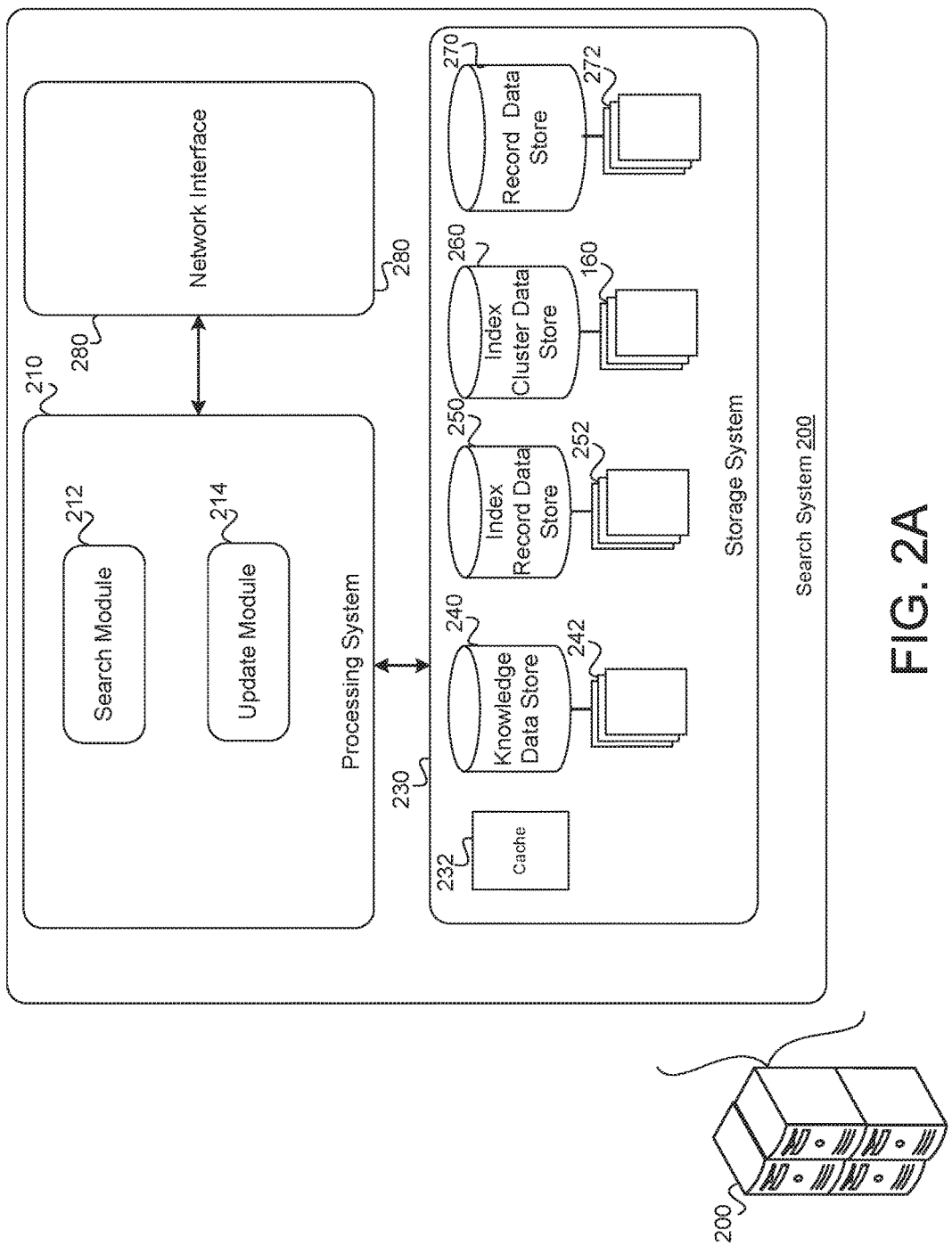
FIG. 2A is a schematic view of example components of a search system.

The search system 200 is distributed in that the resources (e.g., search indexes) powering the search are distributed across a storage system 230 (see, e.g., FIG. 2A). In general, the search system 200 utilizes a plurality of search indexes to identify records that correspond to a search query. A record defines one or more attributes of a document. A document can refer to a webpage, a state of an application, an entry on a digital distribution page, or any other suitable electronic representation of content accessible via a network. Thus, a search index is said to identify documents (which are represented by the records). The search indexes are typically inverted indexes. According to some implementations of the present disclosure, the search indexes are grouped into index clusters 160 (FIG. 1B). An index cluster 160 can refer to a collection of search indexes that are grouped together categorically. For instance, a collection of search indexes may be grouped together because the grouped search indexes reference documents relating to movies, literature, encyclopedia articles, sports, games, history, science, technology, or any other suitable category. According to some implementations, the index clusters 160 are tiered, whereby each tier of an index cluster 160 includes one or more search indexes. Within an index cluster 160, higher-tiered search indexes are search indexes that are more likely to produce relevant documents, while lower-tiered search indexes are less likely to produce relevant documents. For instance, in an index cluster 160 that indexes documents relating to movies, documents that reference new movies and popular releases may be indexed in the first tier, documents that reference movies available for streaming may be indexed in the second tier, and documents that reference all other movie titles may indexed in the third tier (or any number of lower tiers). Further, in some implementations, the higher tiers of an index cluster 160 index fewer documents than lower tiered index clusters 160. In this way, the higher tiers can be searched more quickly and/or replicated more.

FIG. 1B shows an example of an index cluster 160 distributed across a storage system 230. In the shown example, the storage system may include random access memory (RAM) 232, a solid state disk (SSD) 234, and a hard disk drive (HDD) 236. The storage system 230 may include multiple RAM devices 232, SSD devices 234, and HDD devices 236 connected via a bus and/or a network 150, whereby the plurality of index clusters 160 are distributed across the devices of the storage system. Further, individual search indexes may be sharded and/or replicated across multiple memory devices. In the example of FIG. 1B, an index cluster 160 is distributed across a storage system 230. In some implementations, the higher tiered search indexes are stored on respectively faster partitions of the storage system. Additionally or alternatively, higher tiered search indexes may be smaller partitions than lower tiered search indexes so as to reduce the total amount of time needed to search the search index. In the example shown, the first tier 162a of the index cluster 160 is stored on a RAM device 232, the second tier 162b is stored on an SSD device 234, and the third tier 162c is stored on an HHD device 236. In the example shown, the index cluster 160 includes three tiers 162. An index cluster 160, however, may include any suitable number of tiers. Furthermore, while FIG. 1B shows a storage system 230 with RAM devices 232, SSD devices 234, and HDD devices 236, the storage system 230 can include any suitable memory devices.

Referring back to FIG. 1A, the search system 200 receives a search query 102 and performs a consumer driven search and a continuation search based on the search query 102. The consumer driven search is a search of at least one tier 162 of at least one index cluster 160 that produces delivery search results 130. Delivery search results 130 are search results that are transmitted to the requested user device 100. A continuation search is a search of search indexes and index clusters 160 that were not searched during the consumer driven search. The continuation search produces continuation search results 140. Continuation search results 140 include the delivery search results, as well as any search results identified during the continuation search. The search system 200 caches the continuation search results 140, whereby the cached search results 140 are associated with the search query 102 that resulted in the continuation search results 140. When the search system 200 receives a subsequent search query 102 that is identical to (or substantially similar to) a previously processed search query 102 that has search results stored in the cache, the search system 200 can transmit the cached continuation search results 140 (also referred to as the "cached search results" 140). As will be discussed later, the search system 200 can utilize the continuation search results 140 to update a knowledge base 242 and/or the rakings of documents within tiers 162 of a search index 160.

Figure 1C:
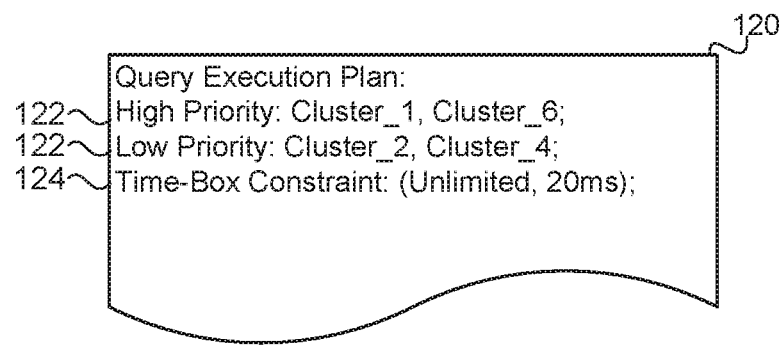
FIGS. 1C and 1D are schematic views of example query execution plans.
Figure 1D:
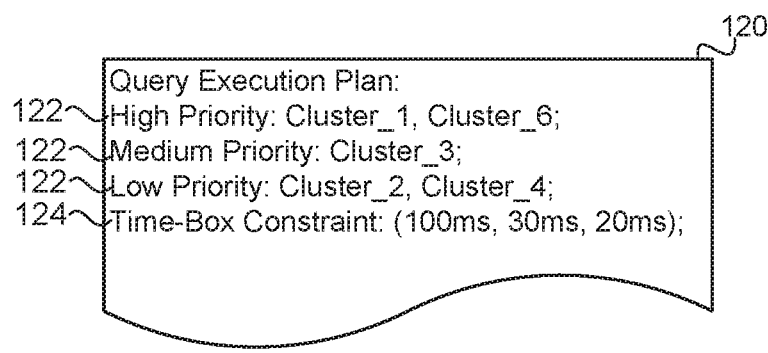

In processing a search query 102, the search system 200 identifies one or more index clusters 160 to search during the consumer driven search and a corresponding query execution plan 120. A query execution plan 120 includes a set of constraints that are placed upon the search system 200 when performing the consumer driven search. FIGS. 1C and 1D show examples of query execution plans 120. A query execution plan 120 includes, for each identified index cluster 160, a priority 122 and a time-box constraint 124.

The priority 122 of a search of an index cluster 160 defines a relative importance placed on the index cluster 160 given the search query 102. As will be discussed in greater detail below, the search system 200 identifies the index clusters 160 to search based on the entity types implicated by the search query 102. In some implementations, the search system 200 parses the search query 102 to identify an intent query 106. The intent query 106 defines the query terms received in the search query 102, potential entity types implicated by the query terms, and entity scores respectively indicating probability values associated with the potential entity types. The probability value associated with a particular entity type indicates a likelihood that a query term or combination of query terms implicated the particular entity type. The potential entity types are used to select the index clusters 160 to search, while the entity scores assigned to the potential entity types are used to assign a priority to the searches of the index clusters 160 that are selected for searching. In some implementations, the priorities that can be assigned to a search of an index cluster 160 are predefined (e.g., a search can be a high priority search of an index cluster 160 or a low priority search of an index cluster 160). For example, in FIG. 1C, the searches of index clusters one and six are assigned a high priority and the searches of clusters two and four are assigned low priority. In some implementations, the search system 200 determines whether to search an index cluster 160 identified in the query execution plan 120 based on the priority assigned to the search of the index cluster 160 and the current demand on the index cluster 160. For instance, if a search of an index cluster 160 is assigned a high priority, then the search system 200 searches the index cluster 160 regardless of the demand on the index cluster 160. If, however, a search of an index cluster 160 is assigned a low priority, the search system 200 may decide to search the index cluster 160 only if the demand on the index cluster 160 is low. If the demand on an index cluster 160 is high and the index cluster 160 has been assigned other high priority searches, the search system 200 may decide to not perform the lower priority searches of the index cluster 160. The demand on an index cluster 160 can refer to an amount of search queries 102 that the index cluster 160 is asked to process at a given time. Furthermore, the search system 200 may decide to forego performing lower priority searches in order to ensure that higher priority searches are executed in a timely manner. In the example of FIG. 1D, the search system 200 can assign three priority levels to searches of an index cluster 160—low priority, medium priority, and high priority. In this example, a medium priority search of an index cluster 160 may take precedence over a lower priority search of the index cluster 160, but may be passed over in favor of a higher priority search of the index cluster 160. The foregoing are examples of priorities. The search system 200 may assign any number of priorities to a search, not just two or three priorities.

A time-box constraint 124 defines one or more time constraints placed on the consumer driven search. A time constraint defines a maximum amount of time that is allotted to the search system 200 to search an index cluster 160 given a search query 102. Put another way, the time-box constraint defines time constraints for each index cluster 160 that is to be searched. In some implementations, the search system 200 determines the time-box constraint based on the priority. In general, higher priority index clusters 160 are allotted more time to be searched than lower priority index clusters 160. For example, the search system 200 may allot searches of high priority index clusters 160 one hundred milliseconds, searches of medium priority index clusters 160 twenty five milliseconds, and searches of low priority index clusters 160 twenty milliseconds. In some implementations, searches of high priority index clusters 160 may be allotted unlimited time. When the allotted time passes for a search of a particular index cluster 160, the search system 200 stops searching the index cluster 160.

Referring back to FIG. 1A, in some implementations, the search system 200 generates an intent query 106 based on the search query 102 and the context parameters 104. As previously discussed, an intent query 106 can define the query terms received in the search query 102, potential entity types implicated by the query terms, and entity scores respectively indicating probability values associated with the potential entity types. The search system 200 leverages a knowledge base 242 to generate the intent query 106. The search system 200 utilizes the intent query 106 to select the index clusters 160 to be searched and to generate the query execution plan 120. The search system 200 then executes the consumer driven search according to the query execution plan 120, thereby generating the delivery search results 130. After the consumer driven search, the search system 200 performs the continuation search. During the continuation search, the search system 200 identifies the continuation search results 140. The search system 200 can update the knowledge base used to generate the intent query 106 and the ranking of documents within an index cluster 160 based on the continuation search results 140. For example, when the intent query 106 indicates a particular entity type is unlikely given a search query 102 (e.g., the entity type has a relatively low entity score), but the continuation search yields continuation search results 140 that strongly suggest that it is likely that the particular query terms implicate the entity type, the search system 200 can update the knowledge base to indicate that those query terms have a stronger correlation with the entity type (which may result in a higher entity score). Similarly, if a document is exceedingly identified in the continuation search results 140, then the search system 200 may decide to move the document to a higher tier in its respective index cluster 160.

Furthermore, when the continuation search results 140 are cached and subsequently delivered in response to a later received search query 102, the search system 200 can monitor the user's response to the continuation search results 140 to determine whether to update the knowledge base and/or the index clusters 160. For example, documents relating to an obscure novel may be indexed in a lower tier of a "literature" index cluster. If, however, the obscure novel is adapted to a movie, interest in documents relating to the obscure novel may increase. In an initial consumer driven search stemming from a search query that contains the title of the movie or obscure novel, the delivery search results 130 may include documents relating to the movie but not the novel because the documents relating to the novel are indexed in lower tiers of the "literature" index cluster. The continuation search results 140, however, should identify the documents relating to the obscure novel (e.g., a state of application that allows a user to purchase a hard copy of the obscure novel from a used book store). The next time the search system 200 receives a search query 102 that contains the title of the novel and movie, the cached continuation search results 140 are transmitted to the user device 100 that provided the search query 102. If the user selects a displayed search result that was identified during the continuation search (e.g., a document that relates to the obscure novel), then the search system 200 may update the index cluster 160 that identified the selected search result (e.g., the "literature" index cluster 160) if the search system 200 determines that the document underlying the selected search result is becoming more popular (e.g., people are more interested in reading the obscure novel once they have seen or heard about the movie).

FIG. 2A is a schematic illustrating an example search system 200 according to some implementations of the present disclosure. The components of the example search system 200 may be distributed across multiple physical locations (e.g., different server clusters and/or different data centers). The search system 200 includes a processing system 210, a network interface device 280, and a storage system 230.

The processing system 210 is a collection of one or more processors that execute computer readable instructions. In implementations having two or more processors, the two or more processors can operate in an individual or distributed manner. In these implementations, the processors may be connected via a bus and/or a network. The processors may be located in the same physical device or may be located in different physical devices. The processing system executes a search module 212 and an update module 214.

The network interface device 280 includes one or more devices that can perform wired or wireless (e.g., Wi-Fi or cellular) communication. Examples of the network interface device 280 include, but are not limited to, a transceiver configured to perform communications using the IEEE 802.11 wireless standard, an Ethernet port, a wireless transmitter, and a universal serial bus (USB) port.

The storage system 230 includes one or more storage devices. The storage devices may be any suitable type of computer readable mediums, including but not limited to: RAM 232, SSD 234, HDD 236, and optical disk drives. The storage devices may be connected via a bus and/or a network. Storage devices may be located at the same physical location (e.g., in the same device and/or the same data center) or may be distributed across multiple physical locations (e.g., across multiple data centers). The storage system 230 stores a knowledge data store 240, an index record data store 250, an index cluster data store 260, and a record data store 270. The storage system also includes a memory cache 232 (referred to as a "cache" 232).

Figure 2B:
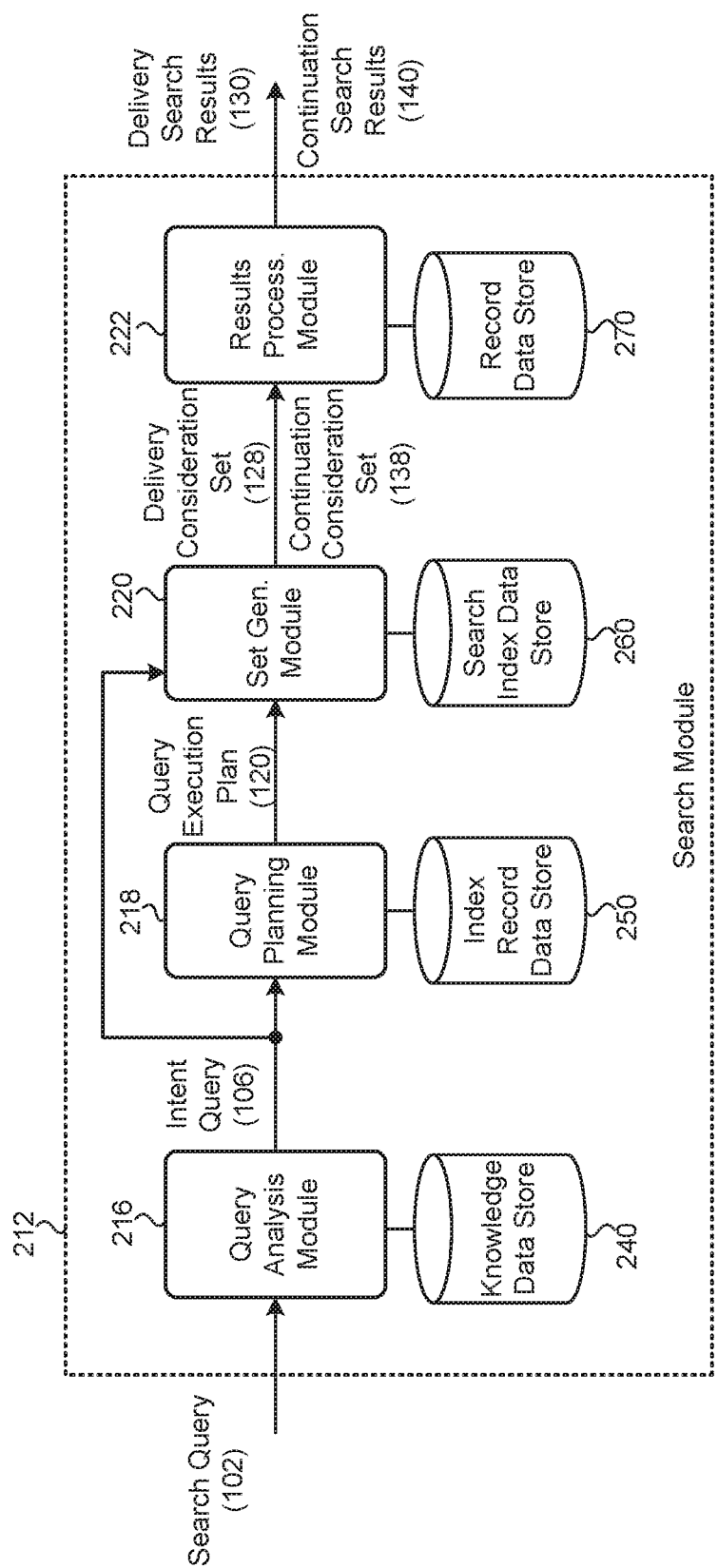
FIG. 2B is a schematic view of example components of the search module and a data flow thereof.

FIG. 2B shows example components of the search module 212 and a data flow thereof. The example search module 212 includes a query analysis module 216, a query planning module 218, a set generation module 220, and a results processing module 222. In some implementations, the query analysis module 216 receives a search query 102 and generates an intent query 106 based on the search query 102 and the contents of the knowledge data store 240. The query planning module 218 may receive the intent query 106 and generate a query execution plan 120 based on the index record data store 250 and the intent query 106. The set generation module 220 receives the query execution plan 120 and executes a consumer driven search on one or more of the index clusters 160 stored in the index cluster data store 260 according to the query execution plan 120 using query terms indicated in the intent query 106. The set generation module 220 outputs a delivery consideration set 128 to the results processing module 222. In some implementations, the delivery consideration set 128 includes a set of scored function identifiers 274 (function IDs 274), each scored function ID indicating a function record 272 (see, e.g., FIGS. 2A and 2D). The results processing module 222 generates delivery search results 130 based on the delivery consideration set 128 and records 272 stored in the record data store 270. The results processing module 222 outputs the delivery search results 130, which are transmitted to the user device 100 that provided the search query 102. After the generation of the delivery search results, the set generation module 220 performs a continuation search on the unsearched portions of the index cluster data store 260. Put another way, the set generation module 220 searches the unsearched indexes clusters 160 (including unsearched tiers of searched index clusters 160). The set generation module 220 generates a continuation consideration set 138, which builds upon the delivery consideration set 128, based on the intent query 106. The set generation module 220 outputs the continuation consideration set 138 to the results processing module 222. The results processing module 222 generates continuation search results 140 based on the continuation consideration set 138. The results processing module 222 outputs the continuation search results 140, which are cached for later delivery. The identification of the continuation consideration set 138 and generation of the continuation search results 140 may be performed at any suitable time, including at low traffic times.

The query analysis module 216 receives the search query 102 and possibly one or more context parameters 104 and outputs an intent query 106 based upon the search query 102, the knowledge data store 240, and possibly the one or more context parameters 104. An intent query 106 is a data structure that defines different possible interpretations of the search query 102. The intent query 106 may be structured as a tree structure where a leaf node contains a query term or combination of query terms, a potential entity type of the query term or combination of query terms, and an entity score. In these implementations, the intermediate nodes above the leaf nodes define logical operators (e.g., OR or AND). The intent query 106 may be represented in any other suitable data structure. In a first example, a search query 102 may be "jfk lax." In this example, "jfk" may be an airport code (John F. Kennedy International Airport in New York, N.Y.) or the initials of former United States President John F. Kennedy, while lax may be an airport code (Los Angeles International Airport) or a shortening of a sport (lacrosse). In this example, the user may be searching for airplane tickets between LAX and JFK, an article about former President Kennedy being a lacrosse player, or information on a high school lacrosse team (e.g., JFK High School). Of these, the most likely is the travel related search query. Thus, the entity scores of the airport entity type (LAX and JFK) are likely to be much higher than the entity scores of other entity types (e.g., sport or high school).

The query analysis module 216 determines the intent query 106 by leveraging a knowledge base 242 stored in a knowledge data store 240. In some implementations, the knowledge base 242 includes one or more entity tables and a set of rules defining manners by which to parse the query. In these implementations, an entity table is a lookup table that relates a term or combination of terms to the possible entity types of the term or combination of terms. Each relation can also have an associated entity score that is a probability value that indicates a likelihood that the term is of that entity type. The entity scores can be determined, for example, heuristically by analyzing large sets of text and documents. The rules can define semantic rules that instruct a parser how to parse a search query 102 and to draw inferences based on the results of parsing. The knowledge base 242 can include any other additional or alternative data structures.

In some implementations, the query analysis module 216 includes one or more parsers that implement the rules and utilize the entity tables to identify potential entity types and determine corresponding entity scores. For example, the query analysis module 216 may include a restaurant parser that parses the search query 102 to identify restaurant names, a cuisine parser that parses the search query 102 to identify cuisine names, a media parser that parses the search query 102 to identify media related terms (e.g., song titles, movie titles, album titles), a person parser that parses the search query 102 to identify names of people, an action parser that parses the search query 102 to identify names of actions (e.g., "read," "watch," "view," "make reservation,"), a place name parser that parses the search query 102 to identify names of places, and an application name parser that parses the search query 102 to identify names of applications. Non-limiting example implementations of a non-limiting set of example parsers are provided in Appendix A. The rules may define structures that clue the query analysis module 216 as to the intention of the user. For example, a rule may instruct the query analysis module 216 to identify stop words such as "to" or "in" when parsing the search query 102 to determine whether a query term or combination of query terms is a place name (e.g., "Thai restaurants in Mountain View" or "taxi to Detroit"). When such a stop word is identified, the parser can look up the query term(s) following the stop word in an entity table that defines place names. If the query term(s) are in the entity table, the entity type defined in the table is assigned to the query term(s) as a potential entity type and the entity score defined in the entity table is assigned to the potential entity type. In another example, a rule may instruct a parser to analyze the search query 102 for particular action terms such as "watch," "view," "stream," or "read." When the parser encounters one of these action words, the parser can compare the query term(s) against an entity table that defines media and book titles. In the event a media or book title follows the action word, the parser can assign the entity type (e.g., "movie" or "book") to the query term(s) following the action word and can assign the entity score defined in the entity table to the entity type. In the event two different constructions of a search query 102 exist, the query analysis module can create multiple leaf nodes in the intent query 106, whereby the different leaf nodes represent the different interpretations of the search query 102. For instance, if the search query 102 is "lax," the user may be referencing the sport or the airport. In this instance, the query analysis module 216 may create a first leaf node that represents a query directed to an airport and a second leaf node that represents a query directed a sport. They query analysis module 216 can connect the leaf nodes with an intermediate node that defines an OR operation. The query analysis module 216 outputs the intent query 106 to the query planning module 218.

Additionally or alternatively, the query analysis module 216 may perform any standard query processing operations. For example, the query analysis module 216 may tokenize the query terms, remove stop words from the search query 102, and stem one or more of the query terms. Further, in some implementations, the query analysis module 216 may output the query terms (tokenized, stemmed, or otherwise) along with a list of potential entity types and entity scores. In these implementations a list of potential entity types and entity scores may not be structured but rather individually output.

The query planning module 218 receives the intent query 106 and generates a query execution plan 120 based on the intent query 106. In generating the query execution plan 120, the query planning module 218 i) identifies which index clusters 160 to search; ii) determines, for each identified index cluster 160, a priority and time-constraint for searching the index cluster 160. To identify the index clusters 160 to search, the query planning module 218 leverages the index record data store 250.

Figure 2C:
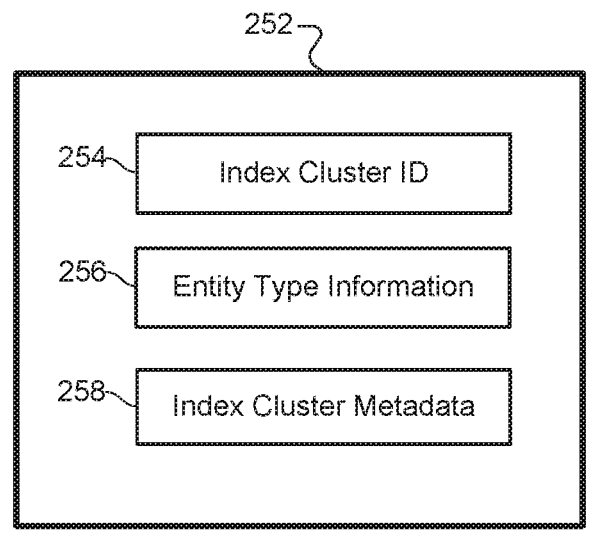
FIG. 2C is a schematic view of an example index cluster record.

The index record data store 250 stores index cluster records 252. Each index cluster record 252 corresponds to a different index cluster 160 stored in the index cluster data store 260. FIG. 2C shows an example of an index cluster record 252. An index cluster record 252 includes an index cluster ID 254, entity type information 256, and index cluster metadata 258. The index cluster ID 254 uniquely identifies an index cluster 160 from other index clusters 160. The index cluster ID 254 may be, for example, an alphanumeric string (e.g., Cluster1234) or a category name (e.g., "movies," "literature," or "sports"). The index cluster ID 254 may be automatically generated each time a new index cluster 160 is generated.

The entity type information 256 lists the entity types that correspond to the index cluster 160 represented by the index cluster record 252. For example, if the index cluster 160 is literature related, the following non-limiting list of entity types may be stored in the entity type information 256 of the corresponding index cluster record 252: "author" "title" "ISBN" "publisher" and "character." In another example, if the index cluster 160 is sports related the following non-limiting list of entity types may be stored in the entity type information 256 of the corresponding index cluster record 252: "sport name," "team name," "player name," and "position name." In yet another example, if the index cluster 160 is restaurant related the following non-limiting list of entity types may be stored in the entity type information 256 of the corresponding index cluster record 252: "restaurant name," "city," "cuisine type," and "rating." The entity type information 256 defined in an index cluster record 252 can be manually curated or can be machine learned.

Index cluster metadata 258 may define any additional information about the corresponding index cluster 160. Examples of index cluster metadata 258 can define how many entries are in the index cluster 160, how many indexes are in the index cluster 160, how many tiers in the index cluster 160, how many replications of each tier of the index cluster 160, how many shards (e.g., horizontal partitions) of each tier of the index cluster 160, a name or identifier of an index cluster search server 290 (see, e.g., FIG. 2E) that searches the index, and locations on the storage system 230 where the indexes (or shards of each search index) of the index cluster 160 are stored.

In some implementations, the contents of each index cluster record 252 may be stored in the index cluster data store 260. In these implementations, the contents of each index cluster record 252 (e.g., index cluster ID 254, entity type information 256, and index cluster metadata 258) may be associated with its corresponding index cluster 160. Put another way, each index cluster 160 stored in the index cluster data store 260 may have its corresponding index cluster record 252 associated and stored therewith in the index cluster data store.

In operation, the query planning module 218 receives the intent query 106 from the query analysis module 216. Based on the intent query 106, the intent query 106 indicates entity types that are potentially implicated by the search query 102 and an entity score indicating a likelihood that the search query 102 implicates the entity type. The query planning module 218 searches the index cluster records 252 to identify any index cluster records 252 that list any of the entity types defined in the intent query 106 in their respective entity type information 256. If an index cluster record 252 lists an entity type defined in the intent query 106, the query planning module 218 selects the corresponding index cluster 160 for inclusion in the query execution plan 120.

For each selected index cluster 160, the query planning module 218 determines a priority 122 of the search of the index cluster 160 and a time constraint 124 for searching the index cluster 160. In some implementations, the query planning module 218 determines the priority 122 of a selected index cluster 160 based on the entity score of the entity type that resulted in the selection of the selected index cluster 160. For instance, the query planning module 218 can assign a high priority to a search a selected index cluster 160 if the entity score of the entity type that resulted in the selection of the selected index cluster 160 is greater than a threshold (e.g., entity score.gtoreq.0.6), and can assign a low priority if the entity score is less than a threshold (e.g., entity score<0.6). In implementations where there are more than two priorities (e.g., high, medium, and low priorities), the query planning module 218 can utilize multiple thresholds to assign priorities. For example, the query planning module 218 can assign a high priority to index clusters 160 where the entity score is greater than an upper threshold (e.g., entity score.gtoreq.0.8), a medium priority to index clusters 160 where the entity score is between the upper threshold and a lower threshold (e.g., 0.8>entity score.gtoreq.0.4) and a low priority to index clusters 160 where the entity score is below the lower threshold (e.g., 0.4>entity score).

In some implementations, the query planning module 218 determines the time constraint 124 of each index cluster 160 based on the priority 122 assigned to the index cluster 160. For example, the query planning module 218 can assign a first time constraint to high priority clusters 160 (e.g., unlimited or 60 ms), a second time constraint to medium priority index clusters 160 (e.g., 25 ms), and a third time constraint to low priority index clusters 160 (e.g., 20 ms). In some implementations, the query planning module 218 can adjust the time constraints 124 of the index clusters 160 based on current load demand on the search system 200. For instance, if the search system 200 is not experiencing a high load demand, the query planning module 218 can increase the time constraints of the index clusters 160. The collection of the time constraints can be combined into a time-box constraint. The time-box constraint lists the time constraints for all the priorities 122 listed in the query execution plan 120.

The set generation module 220 receives the query terms and the query execution plan 120 and performs a consumer driven search and a continuation search based thereon. In some implementations, the set generation module 220 receives the query terms in the intent query 106, while in other implementations the set generation module 220 receives the query terms apart from an intent query 106. Initially the set generation module 220 performs a consumer driven search to identify a delivery consideration set of records (referred to as a "delivery consideration set"). At a later time, the set generation module 220 performs a continuation search to identify a continuation consideration set of records (referred to as "continuation consideration set"). In some implementations, the delivery consideration set and the continuation consideration set are sets of function IDs 274 that identify records 272 stored in the record data store 270. In other implementation, the consideration sets include the actual records 272 in addition to their respective function IDs 274.

In some implementations, the set generation module 220 includes a plurality of index cluster search servers 290 (which may be referred to as "index servers") and a query distribution module 294, whereby each index server 290 is configured to search a particular index cluster 160 or portion of index cluster 160. Furthermore, a single index server 290 may be tasked with searching more than one index cluster 160. FIG. 2E shows an example of a plurality of index servers 290 that work in combination to process the query terms identified in an intent query 106. Each index server 290 may be in communication with the query distribution module 294 and may include a search queue 292 that indicates the query terms that are to be searched by the index server 290. The query distribution module 294 receives an intent query 106 and determines which index clusters 160 are to be searched from the query execution plan 120. For each of these index clusters 160, the query distribution module 294 passes the query terms identified in the intent query 106, the priority assigned to the search of the particular index cluster 160, and a time constraint assigned to the search of the particular index cluster 160. A index server 290 receives a set of one or more query terms, a priority, and a time constraint and searches its corresponding index cluster 160 (or portions thereof) for the query terms and in accordance with the priority and the time constraint. While an index cluster 150 is described as receiving a set of query terms, a priority, and a time-constraint from the query distribution module 294, the query distribution module 294 may package the set of query terms, the priority, and the time constraint in a data structure referred to as an "index cluster query." Thus, when reference is made to providing a set of query terms, a priority, and a time constraint to the index servers 290, the query distribution module 294 may generate an index cluster query using this information and may provide the index cluster query to the index servers 290, according to some implementations of the present disclosure. In some implementations, the index servers 290 is configured in accordance with the Apache Lucene Library by The Apache Software Foundation, which defines instructions for searching indexes. In the example shown, there are five depicted index servers 290 (e.g., 290a, 290b, 290c, 290d, 290e). The first and fifth search servers 290a, 290e receive the intent query 106. The first index server 290a receives the intent query 106 as a high priority search and the fifth index server 290e receives the intent query 106 as a low priority search.

The query distribution module 294 determines which index clusters 160 to search from the query execution plan 120. In some implementations, the query distribution module 294 identifies which index servers 290 are to receive the set of query terms identified in the intent query 106 based on the index clusters 160 to be searched. For each identified index server 290, the query distribution module 294 can insert (e.g., enqueue) the set of query terms into the queue of the identified index server 290, as well as the priority and time constraint. In some implementations, the query distribution module 294 provides this information in an index cluster query. An index server 290 can sequentially process the sets of query terms in its queue 292 or can process the high priority searches ahead of lower priority searches. When the load on the index server 290 is too high (e.g., more than ten intent queries 106 in the queue 292), the index server 290 can remove any low priority (or medium priority) sets of query terms from the queue 292 and can indicate to the query distribution module 294 that the set of query terms was not processed. In some implementations, when the index server 290 determines to remove a low priority set of query terms, the index server 290 does not transmit a message to the query distribution module 294 indicating that the low priority set of query terms was not processed. If the query distribution module 294 does not receive results from a particular index server 290 within an allotted time period, then the query distribution module 294 can assume that the set of query terms was removed from the respective queue 292 and the search was not performed.

The index servers 290 may be configured with instructions that define the manner by which they handle sets of query terms, given the priority and the time constraint. For instance, the index server 290 may be configured to insert high priority searches (e.g., sets of query terms) ahead of lower priority query terms in their respective queues. Additionally or alternatively, the index servers 290 may be configured to adhere to a strategy where high priority searches are executed ahead of lower priority searches in order to ensure that high priority searches are completed within a designated time constraint. In another example, the index servers 290 may be configured to discard a low priority set of query terms from their respective queues if the index server 290 is unlikely to be able to complete the low priority search within the given time constraint.

In processing a set of query terms, an index server 290 obtains the set of query terms from its queue 292 and determines the time constraint assigned to the set of query terms. For example, the index server 290 may dequeue the set of query terms from its corresponding queue 292. The index server 290 then searches its corresponding index cluster 160 in accordance with the time constraint. The index server 290 can begin a timer and can continue searching the index cluster 160 until it has finished the search of the index cluster 160 or until the value of the timer exceeds the time constraint. The index server 290 begins searching the highest tier of the index cluster 160 and as it finishes a tier, it begins searching the next lower tier. An index server 290 searches a tier by querying the search index (or search indexes) contained in the tier with a query term or combination of query terms contained in the set of query terms. If the term is found in the search index, the search index outputs the function IDs 274 of the records 272 which contain the term or the combination of terms. The index server 290 may also output an initial score associated with each function ID 274. In some implementations, the initial score indicates, for example, a term frequency inverse document frequency (TF-IDF) score of the keyword with respect to the document referenced by the function ID. In other implementations, the initial score indicates the number of times a keyword is found in the document (e.g., a term frequency). The initial score may calculated ahead of time (e.g., when the document is initially crawled and indexed) or at any other suitable time. As the index server 290 identifies function IDs in the search index, the index server 290 can return the function IDs 274 to the query distribution module 294, which in turn includes the function IDs 274 into the delivery consideration set 128 (or the continuation delivery set 138 if a continuation search is being performed). The index server 290 can continue in this manner until it has searched the entire index cluster 160 or until the timer value exceeds the time constraint, whichever occurs first. Upon receiving indication from each of the implicated index servers 290, the query distribution module 294 can output the delivery consideration set 128 (or the continuation consideration set 138) to the results processing module 222. If an index server 290 does not finish searching an index cluster 160, the index server 290 can return a value indicating where the index server 290 stopped searching the index cluster 160.

The results processing module 222 receives the delivery consideration set 128 and generates delivery search results 130 based on the delivery consideration set. In some implementations, the results processing module 222 determines, for each function ID in the delivery consideration set, a result score of the function ID. The result score can indicate a degree of relevance of a document indicated by the function ID to the search query 102. In some implementations, the results processing module 222 leverages the data stored in the records data store 270 to determine the result scores.

The records data store 270 stores records 272. The records 272 can include any suitable data that relates to an underlying document (e.g., a website, application state, and/or application download page). For purposes of explanation and example, the records 272 are described as function records which describe states of applications. The exact contents of the records 272, however, may vary without departing from the scope of this disclosure.

Figure 2D:
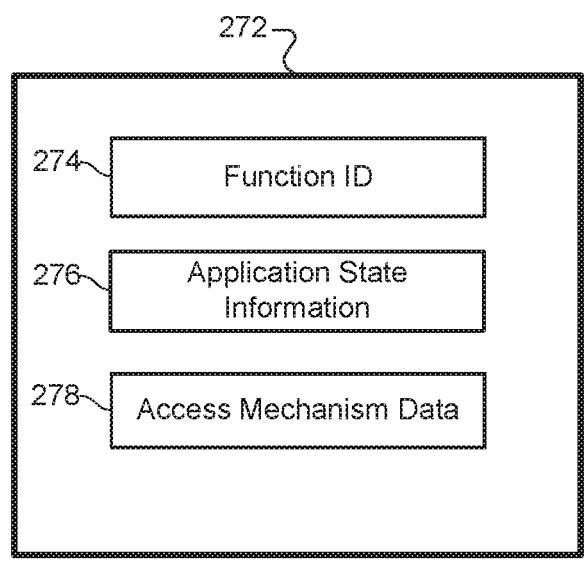
FIG. 2D is a schematic view of an example function record.
Figure 2E:
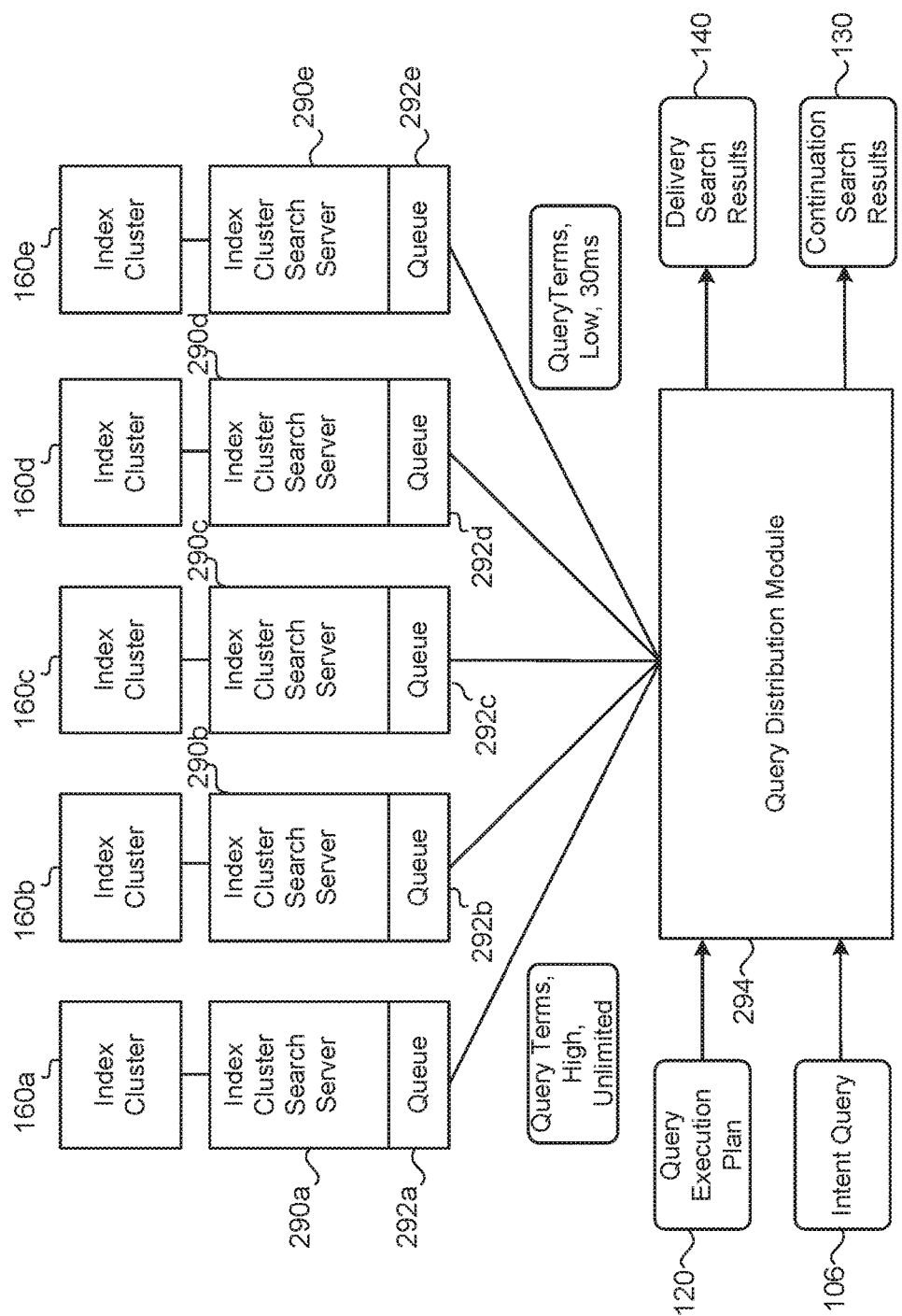
FIG. 2E is a schematic view of example components of a set generation module.

FIG. 2D shows an example function record 272. An example record 272 can include a function identifier 274 (hereinafter "function ID 274"), application state information 276, and access mechanism data 278. The record 272 may include data related to a function of an application and/or the state of the application resulting from performance of the function. The record data store 270 may include a plurality of records having a similar structure as the record 272. Put another way, the record data store 270 may include a plurality of records 272 having a function ID 274, application state information 276, and access mechanism data 278 (e.g., one or more application access mechanisms, one or more web access mechanisms, one or more application download addresses, one or more scripts, and/or one or more templates for generating access mechanisms).

The function ID 274 may be used to identify the record 272 among the other records 272 included in the record data store 270. The function ID 274 may be a string of alphabetic, numeric, and/or symbolic characters (e.g., punctuation marks) that uniquely identify the record 272 in which the function ID 274 is included. In some examples, the function ID 274 may describe a function and/or an application state in human readable form. For example, the function ID 274 may include the name of the application referenced in the access mechanism(s). Additionally, or alternatively, the function ID 274 may be a human readable string that describes a function performed according to the access mechanism(s) and/or an application state resulting from performance of the function according to the access mechanism(s). In some examples, the function ID 274 may include a string in the format of a uniform resource locator (URL) of a web access mechanism for the record 272, which may uniquely identify the record. For example, the function ID 274 may include a URL using a namespace other than "http://," such as "func://," which may indicate that the URL is being used as a function ID in a record. For example, the function ID 274 may include the following string: "func://www.yelp.com/biz/the-french-laundry-yountville-2?ob=1."

In the example shown, the record 272 includes access mechanism data 278. The access mechanism data 278 can include one or more access mechanisms and/or one or more templates for generating access mechanisms. The user device 100 may use the one or more access mechanisms and the one or more web access mechanisms to access the same, or similar, functionality of the native/web application referenced in the application state information. For example, the user device 100 may use the different access mechanisms (e.g., an application access mechanism for accessing an IOS edition of an application, an application access mechanism for accessing an ANDROID edition of an application, and/or web access mechanism for accessing a web edition of an application) to retrieve similar information, play the same song, or play the same movie. The application download addresses may indicate locations where the native applications referenced in the application access mechanisms can be downloaded. In some implementations, access mechanism data 278 can include one or more instructions for accessing a function or state of an application (e.g., a script). In such implementations, the instructions can be used to access states of native applications that are not accessible by an application resource identifier. In particular, the instructions can cause at least one of a search application executing on the user device 100 or operating system of the user device 100 to launch the native application and perform operations to access a specific state or function of the native application.

The application state information 276 may include data that describes an application state into which an application is set according to the access mechanism(s) in the record 272. Additionally, or alternatively, the application state information 276 may include data that describes the function performed according to the access mechanism(s) included in the record 272. The application state information 276 may include a variety of different types of data. For example, the application state information 276 may include structured, semi-structured, and/or unstructured data. The search system 200 may collect, extract, and/or infer the application state information 276 from documents retrieved from remote data sources, such as digital distribution platforms, application descriptions, blogs, application reviews, or other sources that can be accessed via the network 150. Additionally, or alternatively, the application state information 276 may be manually generated data. The search system 200 may update the application state information 276 in any record 272 so that up-to-date search results 130 can be provided in response to a search query 102.

In some examples, the application state information 276 may include data that may be presented to the user by an application when the application is set in the application state defined by the access mechanism data 278. For example, if one of the access mechanism(s) is an application access mechanism, the application state information 276 may include data that describes a state of the native application after the user device 100 has performed the one or more operations indicated in the application access mechanism. In one example, if the record 272 is associated with a shopping application, the application state information 276 may include data that describes products (e.g., names and prices) that are shown when the shopping application is set to the application state defined by the access mechanism data 278. As another example, if the record 272 is associated with a music player application, the application state information 276 may include data that describes a song (e.g., name and artist) that is played when the music player application is set to the application state defined by the access mechanism data 278.

The types of data included in the application state information 276 may depend on the type of information associated with the application state and the functionality defined by the access mechanism(s) 278. In one example, if the record 272 is for an application that provides reviews of restaurants, the application state information 276 may include information (e.g., text and numbers) related to a restaurant, such as a category of the restaurant, reviews of the restaurant, and a menu for the restaurant. In this example, the access mechanism data 278 may cause the application (e.g., a web or native application) to launch and retrieve information for the restaurant (e.g., using a web browser application or one of the native applications installed on the user device 100). As another example, if the record 272 is for an application that plays music, the application state information 276 may include information related to a song, such as the name of the song, the artist, lyrics, and listener reviews. In this example, the access mechanism(s) 278 may cause the application to launch and play the song described in the application state information 276.

The application state information 276 may further define keywords relating to the document described by the record 272. For instance, the application state information 276 may include any text found in the document (e.g., the text appearing in a web page or at a state of a native application). The keywords included in the application state information 276 are indexed in the index clusters 160.

The results processing module 222 generates results scores for the records 272 identified by the delivery consideration set 128 in order to generate delivery search results 130. Similarly, the results processing module 222 generates result scores for the records 272 identified by the continuation consideration set 138 in order to generate continuation search results 140. The result scores associated with a record 272 may indicate the relative rank of the record 272 (e.g., the access mechanisms) among other records 272. For example, a larger result score may indicate that a record 272 is more relevant to the received search query 102 than a record 272 having a lesser result score.

The information conveyed by the search results 130 may depend on how the result scores are calculated by the results processing module 222. For example, in implementations where the records 272 correspond to states of applications, the result scores may indicate the relevance of an application function or application state to the search query 102, the popularity of an application function or state, or other properties of the application function or state, depending on which features the results processing module 222 is configured to score the records 272.

The results processing module 222 may determine result scores in a variety of different manners. In some implementations, the results processing module 222 generates a result score for a record 272 based on one or more scoring features. The scoring features may be record scoring features associated with the record 272 and/or query scoring features associated with the search query 102 (or intent query 106). A record scoring feature may be based on any data associated with a record 272. For example, record scoring features may be based on any data included in the application state information 276 of the record 272. Example record scoring features may be based on metrics associated with a person, place, or thing described in the record 272. Example metrics may include the popularity of a place described in the record 272 and/or ratings (e.g., user ratings) of the place described in the record 272. In one example, if the record 272 describes a song, a metric may be based on the popularity of the song described in the record 272 and/or ratings (e.g., user ratings) of the song described in the record 272. The record scoring features may also be based on measurements associated with the record 272, such as how often the record 272 is retrieved during a search and how often access mechanisms of the record 272 are selected by users. Record scoring features may also be based on whether the record 272 includes an application access mechanism that leads to a default state or a deeper native application state.

A query scoring feature may include any data associated with the search query 102 (or intent query 106). For example, query scoring features may include, but are not limited to, a number of words in the search query 102 (or intent query 106), the popularity of the search query 102, the expected frequency of the words in the search query 102, and the entity scores corresponding to the query term or terms that resulted in the record being selected. A record-query scoring feature may include any data generated based on data associated with both the record and the search query 102 that resulted in identification of the record 272 by the set generation module 220. For example, record-query scoring features may include, but are not limited to, parameters that indicate how well the terms of the search query 102 match the terms of the application state information 276 of the identified record 272 (e.g., the initial score associated with the function ID 274 of the record 272). The results processing module 222 may generate a result score for a record based on any combination of the record scoring features, the query scoring features, and the record-query scoring features.

The results processing module 222 may determine a result score based on one or more of the scoring features listed herein and/or additional scoring features not explicitly listed. In some examples, the results processing module 222 may include one or more machine learned models (e.g., a supervised learning model) configured to receive one or more scoring features. The one or more machine learned models may generate result scores based on at least one of the record scoring features, the query scoring features, and the record-query scoring features. For example, the results processing module 222 may pair the search query 102 with each record 272 and calculate a vector of features for each (query, record) pair. The vector of features may include one or more record scoring features, one or more query scoring features, and one or more record-query scoring features. The results processing module 222 may then input the vector of features into a machine-learned regression model to calculate a result score for the record. In some examples, the machine-learned regression model may include a set of decision trees (e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels.

The result scores associated with the records 272 may be used in a variety of different ways. The results processing module 222 can select records 272 to include in the delivery search results 130 (or continuation search results 140). In particular, the results processing module 222 can rank the records according to their respective result score and select the records 272 for inclusion in the delivery search results 130 based on the ranking. For example, the results processing module 222 can select the highest ranking records 272 up to a threshold (e.g., 25 records) or can select all records 272 having a score above a threshold. For each selected record 272, the results processing module 222 can generate a result object based on the contents of the record 272. A result object is a combination of data and instructions that a user device 100 utilizes to render an individual search result. In some implementations, the results processing module 222 can use a result object template and populate the template with the access mechanisms contained in the record 272 and any other additional relevant data (e.g., function ID, a description, a logo, the result score, etc.). The results processing module 222 can then transmit the generated result objects (i.e., the delivery search results 130) to the user device 100. The generated result objects may be included in a container, such as a hyper-text markup language (HTML) document that can be embedded in another HTML document (e.g., via an iFrame) or a Java script objection notation (JSON) object.

The foregoing description of the set generation module 220 and the results processing module 222 primarily made reference to generating the delivery consideration set 128 and the delivery search results 130 based thereon. At any time after the identification of the delivery consideration set 128, the set generation module 220 can begin executing the continuation search. The set generation module 220 outputs a continuation consideration set 138, which includes the contents of the delivery consideration set 128. In some implementations, the query distribution module 294 retransmits the query terms to each of the index servers 290 implicated by the query execution plan 120 but without any time constraints (e.g., an unlimited time to process the set of query terms). In these implementations, the set generation module 220 can designate the set of query terms as having the lowest priority with no time constraint. Each selected index servers 290 can process the intent query 106 at a time when the queue of the index server 290 is not overly full (that is, the demand on the index server 290 is relatively low). In these implementations, the set generation module 220 outputs the continuation consideration set 138 to the results processing module 222. In this way, the set generation module 220 ensures that all of the index clusters 160 identified in the query execution plan 120 are fully searched, but at a time when the index servers 290 can handle the load. For instance, a typically busy index server 290 can execute the lowest priority searches at a time that is historically slow for the search system 200 (e.g., the very early morning). In other implementations, the set generation module 220 can instruct each index server 290 to begin the continuation search at the point which it stopped searching during the consumer driven search. In these implementations, the set generation module 220 can append the continuation consideration set 138 to the delivery consideration set 128. In some implementations, the query distribution module 294 passes the set of query terms to all of the index servers 290, not just the index server 290 corresponding to the index clusters 160 identified in the query execution plan 120. In some of these implementations, the query distribution module 294 indicates that the search is of lowest priority but has no time constraint. In this way, the continuation search results 130 can identify any potentially relevant documents, regardless of which index cluster 160 indexes the document. Such searching may uncover documents that may be indexed in index clusters 160 that primarily serve other countries or documents in other languages.

The results processing module 222 receives the continuation consideration set 138 and generates continuation search results 140 based thereon. The results processing module 222 may operate in the manner above to generate the continuation search results 140, except that the results processing module 222 does not need to encode the continuation search results 140 into result objects or containers and does not need to include visual data in the continuation search results 140. The results processing module 222 can store the continuation search results 140 on a cache 232 included in the storage system 230. The results processing module 222 may also output the continuation search results 140 to the update module 214.

Figure 2F:
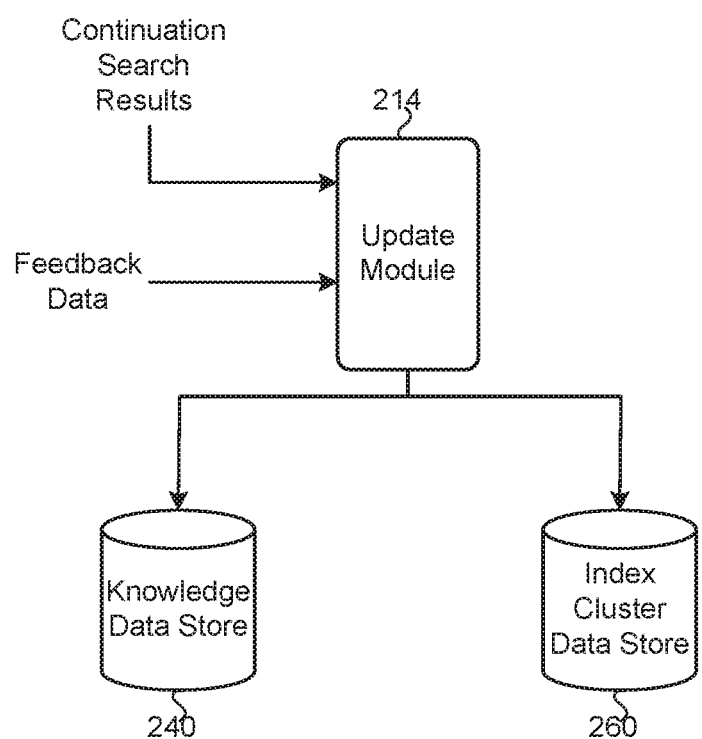
FIG. 2F is a schematic view of an example data flow of an update module.

Referring now to FIG. 2F, the update module 214 can receive continuation search results 140 and/or feedback data 110 and can update the knowledge data store 240 or the index cluster data store 260 based on the continuation search results 140 and/or the feedback data 110.

In some implementations, the update module 214 updates the index cluster data store 260 based on continuation search results 140. As documents appear more in continuation search results 140, the update module 214 can infer that the document may be more relevant than its relative ranking. In particular, the update module 214 can adjust the tiers of an index cluster 160 if a particular document is increasingly identified in the continuation search results 140. For instance, if a document pertaining to the lacrosse is increasingly appearing in the continuation search results 140 but is in a low tier of an index cluster 160 (e.g., third tier), the update module 214 can move the document from the lower tier to a higher tier.

In some implementations, the update module 214 updates the knowledge data store 240 based on the continuation search results 140. The inclusion of a document in the continuation in the search results 140 may validate an entity type association to a particular query term or set of query terms. As described above, a query term or combination of query terms may implicate one or more entity types. Each entity type can have an entity score corresponding thereto. The query analysis module 216 leverages the knowledge data store 240 to identify the potential entity types and the entity scores thereof. The query planning module 218 utilizes the entity types to select which index clusters 160 to search. The update module 214 can work backwards from this point. When a document is included in the continuation search results 140, the update module 214 can identify the index cluster 160 that produced the document. The update module 214 can then determine the potential entity type that resulted in the selection of the index cluster 160. In this way, the update module 214 knows the query term or query terms that resulted in a document being included in the search results 140 as well as the entity type that resulted in the selection of the index cluster 160. By knowing the association between the query term or terms and the entity type, the update module 214 can find the query term(s) and entity type combination in the knowledge base (e.g., in a rule or in a node of a graph) and can update the entity score of the combination. For example, the update module 214 can boost the entity score in the knowledge base. The update module 214 can update the entity score in other suitable manners. For instance, if the knowledge base 242 includes the statistics on which the entity score is based, the update module 214 can update the statistics, and therefore, the entity score. Furthermore, when multiple documents are retrieved from an index cluster using the same query term or terms, the amount by which the update module 214 boosts the entity score may be increased.

In some implementations, the update module 214 can update the knowledge data store 240 or the ranking of an index cluster based on feedback data 110. The feedback data 110 is data that is received from a user device 100 in response to being presented with delivery search results 130. For example, feedback data 110 can indicate which, if any, of the delivery search results 130 were selected by a user in response to being presented with the delivery search results 130. When the update module 214 receives feedback data 110, the update module 214 can identify the query term or terms that resulted in the selected search result. The update module 214 can then update the knowledge data store 240 or a ranking within an index cluster 160 in the manner described above.

Figure 3:
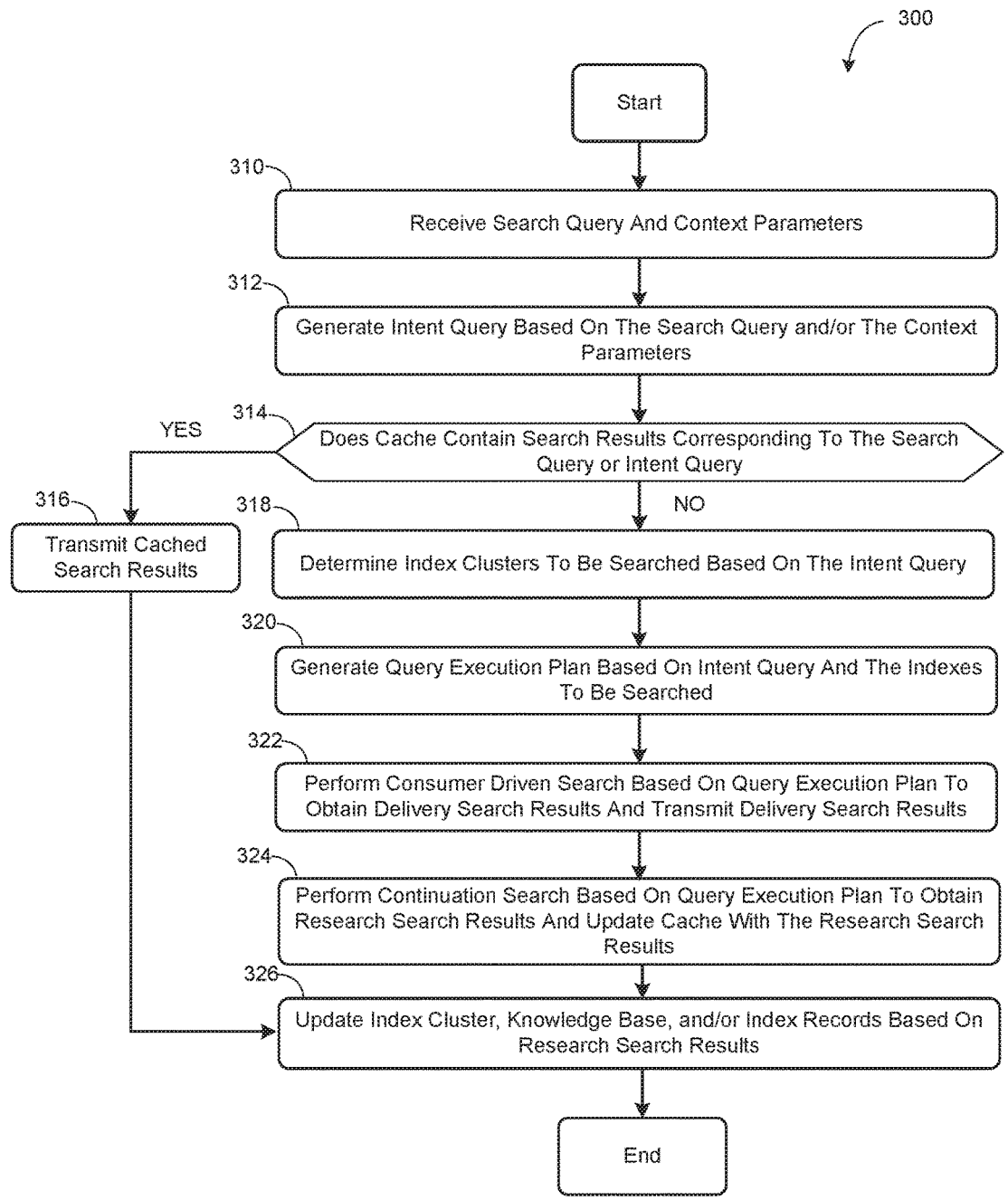
FIGS. 3 and 4 are flow charts illustrating example sets of operations for methods for executing searches.

Referring now to FIG. 3, an example set of operations of a method 300 for performing a distributed search on a search system 200. For purposes of explanation, the method 300 is described with respect to the components of the search system 200 of FIG. 2. Though described herein with reference to FIG. 2A, the method 300 may be executed by any suitable computing system.

At operation 310, the query analysis module 216 receives a search query 102 from a remote device. In some implementations, the remote device includes one or more context parameters 104 with the search query 102 (such as a geo-location of the user device 100 that provided the search query 102 or an operating system type of the user device 100). The remote device may be a user device 100 or a partner device (e.g., a third party computing system) in communication with a user device 100. In the latter scenario, the search system 200 may power at least some of the search capabilities of a partner service, whereby the partner device routs a search query 102 received from a user device or other suitable device to the search system 200 and the search system 200 responds to the partner device with the delivery search results 130 (discussed below). The partner device then transmits the delivery search results 130 to the user device 100.

At operation 312, the query analysis module 216 generates an intent query 106 based on the search query 102 and, in some examples, the context parameters 104. The query analysis module 216 leverages the knowledge base 242 stored in the knowledge data store 240. In some implementations, the knowledge base 242 includes one or more entity tables and rules that instruct one or more parsers in the query analysis module 216 how to parse the search query 102 and identify any potential entity types in the search query 102 or context parameters 104. The query analysis module 216 can generate the intent query 106 in the manner described above.

At operation 314, the search module 212 checks the cache to determine whether there are cached continuation search results 140 corresponding to the intent query 106 or the search query 102 stored therein. As previously discussed, when the search module 212 (e.g., the set generation module 220 and results processing module 222) generate the continuation search results 140, the continuation search results 140 are cached for later delivery. The search module 212 can do a lookup on the cache using the search query 102 or the intent query 106 to determine whether there are cached continuation search results 140 corresponding to the search query 102 or the intent query 106. If so, the search module 212 transmits the cached continuation search results 140 to the requesting device, as shown at operation 316. In some implementations, the results processing module 222 retrieves the cached continuation search results 140 from the cache 232 and may further process the cached continuation search results 140 such that the cached continuation search results 140 may be rendered and displayed by a user device 100. For instance, the results processing module 222 may retrieve information that is to be included in the continuation search results 140. For instance, the results processing module 222 may, for each function ID 274 represented in the cached continuation search results 140, retrieve the corresponding record 272. For each function ID 274, the results processing module 222 generates a result object using a template and then populates the result object with any suitable data. The results processing module 222 can include the result objects in a container (e.g., an HTML document or a .json file). The results processing module 222 then transmits the container to the remote device.

If, however, there are no cached continuation search results 140 corresponding to the search query 102 or the intent query 106, the query planning module 218 determines which index clusters 160 are to be searched based on the intent query 106, as shown at operation 318. The query planning module 218 identifies the potential entity types defined in the intent query 106 that have an intent score above a threshold. In some implementations, the threshold is zero. In other implementations, the threshold is a non-trivial value (e.g., entity score.gtoreq.0.05). For each of the identified potential entity types, the query planning module 218 retrieves index cluster records 252 that list one or more of the potential entity types in their respective entity type information 256. Each retrieved index cluster record 252 identifies a different index cluster 160. The index clusters 160 identified by the index cluster records 252 are the group of index clusters 160 that are to be searched during the consumer driven search.

At operation 320, the query planning module 218 generates a query execution plan 120 based on the intent query 106 and the index clusters 160 to be searched. The query planning module 218 determines a respective priority for the search of each index clusters 160 that are to be searched. In some implementations, the query planning module 218 determines the priority of a search of an index cluster 160 based on the potential entity types that implicated the index cluster 160. In the event that more than one potential entity type implicates an index cluster 160, the query planning module 218 bases the priority on the entity score of the potential entity type having the highest entity score. In some implementations, the query planning module 218 compares the entity score to one or more thresholds and sets the priority based on the comparison. For each index cluster 160, the query planning module 218 determines a time constraint for searching the cluster. The query planning module 218 can set the time constraint of an index cluster 160 based on the priority assigned to the index cluster 160. For example, high priority index clusters 160 may be allotted unlimited time or a relatively high time constraint (e.g., 100 ms). Low priority index clusters 160 are given relatively lesser time constraints (e.g., 20 ms). The query planning module 218 aggregates the priorities and time constraints into the query execution plan 120.

At operation 322, the set generation module 220 and the results processing module 222 perform a consumer driven search based on a set of query terms identified in the intent query 106 and in accordance with the query execution plan 120. The set generation module 220 receives the intent query 106 and the query execution plan 120. According to some implementations, for each index cluster 160 identified in the query execution plan 120, a query distribution module 294 passes the set of query terms (or in some implementations, the entire intent query 106), the priority, and the time constraint to an index server 290 that searches the index cluster 160. The index server 290 enqueues the set of query terms in its queue 292 with any other unprocessed sets of query terms. The index server 290 processes the sets of the query terms in the queue according to their respective priorities and/or the order in which it received the sets of query terms. If a set of query terms 106 has a low priority (or medium priority) and the index server 290 does not have the bandwidth to process the low priority (or medium priority) set of query terms, the index server 290 discards the set of query terms. Otherwise, the index server 290 searches the index cluster 160 for one or more query terms contained in the set of query terms. The index server 290 begins with the highest tiers and continues the search to the lower tiers. The index server 290 continues to search the index cluster 160 in this manner until either it finishes searching the index cluster 160 or a timer value associated with the search exceeds the time constraint. As each index server 290 identifies documents in its respective index cluster 160, the index server 290 returns a function ID 274 corresponding to the identified document to the query distribution module 294, which in turn includes the function ID 274 in the delivery consideration set 128. When each of the index servers 290 completes its search or indicates that it could not process the set of query terms, the query distribution module 294 outputs the delivery consideration set 128 to the results processing module 222.

The results processing module 222 receives the delivery consideration set 128 and generates delivery search results 130 based thereon. The results processing module 222 can score and rank the function IDs contained in the delivery consideration set 128. The results processing module 222 then generates the delivery search results 130 based on the scored function IDs. In particular, the results processing module 222 can generate result objects corresponding to one or more of the scored function IDs. The results processing module 222 can include textual data and/or visual data. In some implementations, the results processing module 222 obtains the textual data and/or the visual data from a record 272 corresponding to a function ID 274. The results processing module 222 packages the result objects in a container (e.g., HTML document or .json file) and transmits the container to the remote device.

At operation 324, the set generation module 220 and the results processing module 222 perform continuation search based on the intent query 106. In some implementations, the set generation module 220 searches all of the index clusters 160 of the search system 200 using the set of query terms included in the intent query 106. In these implementations, the set generation module 220 can pass the set of query terms to each of the index clusters 160 with a low priority and with no time constraint. In this way, each index server 290 can process the intent query 106 when it has availability to do so. In other implementations, the set generation module 220 only searches the index clusters 160 identified in the query execution plan 120. In these implementations, the set generation module 220 can send the set of query terms to each of the index clusters 160 identified in the query execution plan 120 with a low priority and with no time constraint. In some implementations, the set generation module 220 only searches unsearched portions of the index clusters 160. In some of these implementations, the query distribution module 294 can pass the set of query terms to each of the index clusters 160 identified in the query execution plan 120 with a low priority, with no time constraint, and a starting point for the search. For example, if a particular index server 290 stopped searching an index cluster 160 after the first tier, the query distribution module 294 can include an instruction to the index server 290 to begin searching at the second tier during the continuation search. In these implementations, the set generation module 220 can search only index clusters 160 identified in the query execution plan 120 or can search the entire collection of index clusters 160. As each index server 290 identifies documents in its respective index cluster 160, the index server 290 returns a function ID 274 corresponding to the identified document to the query distribution module 294, which includes the function ID 274 in the continuation consideration set 138. In implementations where the set generation module 220 begins searching where the consumer driven search left off (i.e., unsearched index clusters 160 and/or unsearched portions of index clusters 160) the set generation module 220 amends the delivery consideration set 128 to the continuation consideration set 138. When each of the index servers 290 completes its search or indicates that it could not process the set of query terms, the query distribution module 294 outputs the delivery consideration set 128 to the results processing module 222.

The results processing module 222 receives the continuation consideration set 138 and generates continuation search results 140 based thereon. In some implementations, the continuation search results 140 differ from the delivery search results 130 in that the continuation search results 140 may not be generated into a renderable format (e.g., not encoded in result objects or no textual/visual data). Further, the continuation search results 130 are cached, while the delivery search results 130 are transmitted to a remote device. The results processing module 222 can determine a result score for each function ID in the consideration set, and can rank the function IDs according to their respective result scores. Further, the results processing module 222 may exclude any function IDs not having a requisite result score from the continuation search results 140. The results processing module 222 can then store the scored and/or ranked set of function IDs (or actual records 270) in a cache 232. The results processing module 222 may also output the continuation search results 140 to the update module 214.

At operation 326, the update module 214 updates the knowledge base 242 and/or the index cluster data store 260 based on the continuation search results 140. As previously described, the update module 214 can determine which index clusters 160 produced relevant search results, and for those index clusters 160 which entity types implicated these index clusters 160 so as to be included in the query execution plan 120. The update module 214 can identify the query term or combination of query terms that implicated these entity types. In this way, the update module 214 identifies the relevant query term/entity type associations (or combination of query term/entity type associations). The update module 214 can then update the knowledge base 242 based on this information. Additionally or alternatively, if a document indexed in a lower tier of an index cluster 160 is increasingly appearing in continuation search results 140, then the update module 214 may update the ranking of the document in the index cluster 160, so as to move the document higher in the index cluster 160. Moving a document within an index cluster 160 may include adding a function ID corresponding to the document to a search index that is in a higher tier than the current search index of the document.

The method 300 of FIG. 3 is provided for example. Variations of the method 300 are contemplated and are within the scope of the disclosure.

Figure 4:
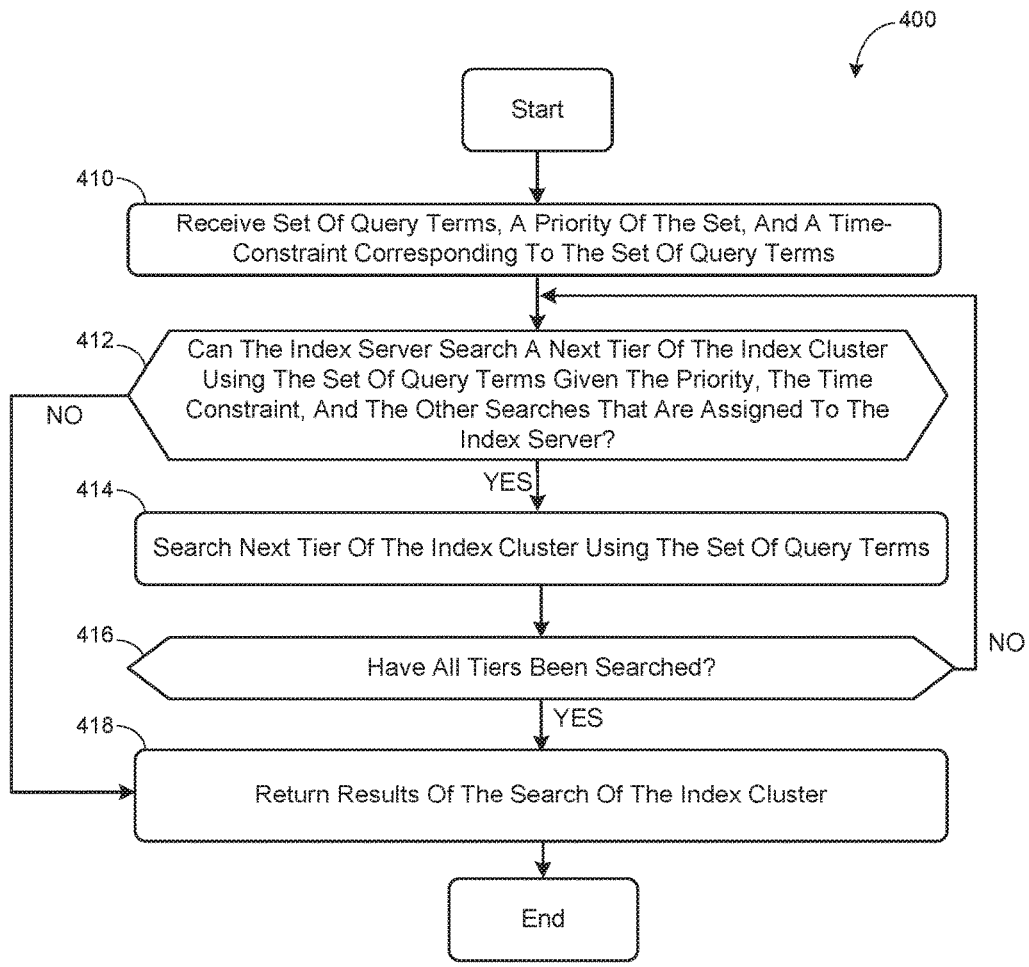

FIG. 4 shows an example set of operations for a method 400 for performing a consumer driven search or a continuation search. In some implementations, the method 400 is performed by individual index cluster search servers 290 ("index servers") that receive a set of query terms from the query distribution module 294.

At operation 410, an index server 290 receives a set of query terms, a priority of the set of query terms, and a time-constraint corresponding to the set of query terms. In some implementations, the set of query terms may be received in an index cluster query or an analogous data structure. In some implementations, the index server 290 inserts the set of query terms (e.g., the index cluster query) in its respective queue 292. In some implementations, the index server 290 inserts high priority sets of query terms in the queue ahead of lower priority sets of query terms. In other implementations, the index server 290 inserts the sets of query terms in its queue 292 in the order in which it received the set of query terms. The index server 290 may utilize any other suitable data structures instead of a queue 292 for temporarily storing the set of query terms (e.g., a stack).

At operation 412, the index server 290 determines whether it can search a next unsearched tier of the index cluster 160 using the set of query terms given the priority, the time constraint, and the other searches assigned to the index server 290. Initially, before any tiers of the index cluster 160 have been searched, the index server 290 may remove the set of query terms (e.g., the index cluster query) from the queue 292 and check the priority of the set of query terms and the time constraint to determine whether there are higher priority sets of query terms and whether it can search the first tier using the set of query terms given the time constraint. For example, if the set of query terms are of low priority and the index server 290 has a significant number of higher priority queries in its queue 292, then the index server 290 removes the set of query terms from the queue 292 and the search is not performed. Similarly, if the index server 290 cannot search the first tier of the index cluster 190 given the time constraint, the index server 290 does not begin to process the low priority set of query terms. When the index server 290 cannot search the first tier of the index cluster 160, the index server 290 removes the set of query terms from the queue 292 and does not have any results to return at operating 418. If the index server 160 determines that it can search the first tier of the index cluster 290, the index server 290 searches the first tier of the index cluster 160, as shown at 414.

At operation 416, the index server 290 determines whether the entire index cluster (e.g., all the tiers) have been searched. If so, the index server 290 returns the results of the search to the query distribution module 294. In such a scenario, the entire index cluster 160 has been searched and the results that are returned are exhaustive. If the entire index cluster 160 has not been searched, the index server 290 determines whether it can search a next tier of the index cluster 160 given the priority and time constraint, as shown at 412. If so, the index server 290 searches the next tier of the index cluster 160, as shown at 414. Otherwise, the index server 290 returns the results of the search to the query distribution module 294. In such a scenario, the index server 290 returns a non-exhaustive set of results (e.g., function IDs), as not all of the tiers of the index cluster 160 have been searched. The index server 290 can continue to process the set of query terms in this manner (e.g., operations 412, 414, and 416) until the entire index cluster 160 is searched or the search server 290 determines that it cannot complete the search of the entire index cluster 160 given the time-constraint. When either determination is made, the index server 290 returns the results (e.g., function IDs) that it identified to the query distribution module 294, as shown at 418.

The method 400 of FIG. 4 is provided for example. Variations of the method 400 are contemplated and are within the scope of the disclosure. For instance, the logic by which the index server 290 orders its queue 292 or processes a set of query terms 292 given a priority and time constraint may be altered. For instance, the index server 290 may estimate the amount of time needed to perform each of the high priority searches and may reorder the queue 292 or the order in which it processes sets of query terms in the queue 292 based on the time-constraints assigned to the searches and how much time has lapsed with respect to each search.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus," "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all shown operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
receiving, at a processing system, a search query containing one or more query terms from a remote device;
determining, by the processing system, one or more entity types implicated by the search query based on the one or more query terms, and for each entity type, determining an entity score indicating a likelihood that the search query implicates the entity type;
identifying, by the processing system, one or more index clusters from a plurality of index clusters to search based on the one or more entity types implicated by the search query, each index cluster having a plurality of tiers, and each tier including one or more search indexes;
generating, by the processing system, a query execution plan based on the entity scores of the one or more entity types, the query execution plan indicating, for each identified index cluster, i) a priority assigned to a search of the index cluster and ii) a time constraint assigned to the indicating cluster indicating a maximum amount of time allotted to search the index cluster;
performing, by the processing system, a consumer driven search on the identified index clusters based on a set of query terms corresponding to the one or more query terms and in accordance with the query execution plan to identify a delivery consideration set of records;
generating, by the processing system, delivery search results based on the delivery consideration set of records; and
transmitting the delivery search results from the processing system to the remote device;
performing, by the processing system, a continuation search, wherein performing the continuation search comprises, for each index cluster indicated in the query execution plan:
assigning a lowest priority and an unlimited time constraint to the set of query terms with respect to the index cluster;
inserting the set of query terms in a queue corresponding to the index cluster with other intent queries, each other intent query having a respective priority assigned thereto;
searching all tiers of the index cluster using the set of query terms; and
updating a continuation consideration set of records based on the searching, wherein the continuation consideration set of records indicates records identified across all of the index clusters indicated in the query execution plan.

* * * * *